United States Patent
Zenios et al.

(10) Patent No.: US 6,178,291 B1
(45) Date of Patent: Jan. 23, 2001

(54) DEMAND ANTICIPATION CONTROL SYSTEM FOR A HIGH EFFICIENCY ULTRA-PURE FLUID HEATER

(75) Inventors: Theofani Zenios, Youngstown; Howard J. Base, Macedonia, both of OH (US)

(73) Assignee: Lufran Incorporated, Streetsboro, OH (US)

( * ) Notice: Under 35 U.S.C. 154(b), the term of this patent shall be extended for 0 days.

(21) Appl. No.: 09/235,199

(22) Filed: Jan. 22, 1999

Related U.S. Application Data

(60) Provisional application No. 60/072,321, filed on Jan. 23, 1998.

(51) Int. Cl.[7] ....................................................... F24H 1/10
(52) U.S. Cl. ............................... 392/479; 392/480; 392/485
(58) Field of Search ..................................... 219/497, 523; 392/466, 479, 480, 481, 485, 487, 488, 489, 491

(56) References Cited

U.S. PATENT DOCUMENTS

| | | | |
|---|---|---|---|
| 3,952,182 | * 4/1976 | Flanders ................................ | 392/466 |
| 4,158,764 | * 6/1979 | Yane .................................... | 219/523 |
| 4,337,388 | 6/1982 | July . | |
| 4,553,024 | * 11/1985 | Findlay ................................ | 219/523 |
| 4,567,350 | * 1/1986 | Todd, Jr. ............................. | 392/489 |
| 4,638,147 | * 1/1987 | Dytch et al. ......................... | 392/485 |
| 4,713,525 | 12/1987 | Eastep . | |
| 4,835,365 | 5/1989 | Etheridge . | |
| 4,970,373 | * 11/1990 | Lutz et al. ........................... | 219/497 |
| 5,325,822 | * 7/1994 | Fernandez ........................... | 392/491 |
| 5,396,574 | 3/1995 | Base et al. . | |
| 5,437,003 | * 7/1995 | Blanco ................................ | 392/485 |
| 5,438,642 | 8/1995 | Posen . | |
| 5,590,240 | 12/1996 | Rezabek . | |
| 5,866,880 | * 2/1999 | Seitz et al. .......................... | 392/485 |
| 5,919,386 | * 7/1999 | James .................................. | 219/523 |
| 6,080,971 | * 6/2000 | Seitz et al. .......................... | 392/485 |

* cited by examiner

*Primary Examiner*—Teresa Walberg
*Assistant Examiner*—Fadi H. Dahbour
(74) *Attorney, Agent, or Firm*—Fay, Sharpe, Fagan, Minnich & McKee, LLP

(57) ABSTRACT

A control system for an in-line, ultra-pure deionized water (UPDI) heater including a housing, at least one fluid pathway through the housing, and a resistive heating element proximate the fluid pathway for heating an operating fluid flowing through the pathway. The control system includes a mechanism for determining an actual power value which is indicative of the power being applied to the resistive heating element, a mechanism for determining a needed power value which is indicative of the power required to achieve an outlet fluid temperature substantially equal to a user-selectable preset fluid temperature, a mechanism for adjusting the actual power applied to the resistive heating element based on an offset between the actual power value and the needed power value, and a mechanism for overriding the adjusting mechanism when the offset is greater than a predetermined level.

14 Claims, 2 Drawing Sheets

DEMAND ANTICIPATION CONTROL SYSTEM FOR A HIGH EFFICIENCY ULTRA-PURE FLUID HEATER

CROSS REFERENCE TO RELATED APPLICATIONS

This application claims the benefit of U.S. Provisional Patent Application Ser. No. 60/072,321, filed Jan. 23, 1998.

BACKGROUND OF THE INVENTION

The present invention relates generally to fluid heaters, and more particularly to a demand anticipation control system for a high-efficiency, ultra-pure deionized (UPDI) water heater.

Larger wafer sizes, smaller device geometry, and greater circuit density have driven the need for very accurate temperature control of fluids used to produce semiconductors. Heated UPDI water is one such fluid used in the manufacture of semiconductor devices. However, UPDI water is a corrosive liquid. Thus, equipment used for heating UPDI water must be capable of withstanding the corrosive effects of the UPDI water that flows therethrough.

In addition, it is critical that the equipment used to manufacture semiconductor devices be capable of performing specific tasks while not introducing contaminates into the manufacturing process. One such fluid heater that can withstand the corrosive effects of UPDI water and not introduce contaminants into the manufacturing process is described and claimed in U.S. patent application No. 09/006,112 filed Jan. 13, 1998 and titled "High Efficiency Ultra-Pure Fluid Heater". The referenced U.S. patent application has been assigned to the same Corporation who is to be the Assignee of the present invention, and is hereby incorporated by reference in its entirety.

Fluid heaters conventionally utilize a temperature control system to maintain the desired operating fluid temperature. A commonly available Proportional Integral Derivative (PID) controller is good at maintaining an accurate fluid temperature as long as the load (e.g. fluid flow through the heater) is steady state. To achieve a steady-state fluid flow, a high-flow bypass has been commonly used to allow a steady state flow of UPDI water through a heating system. In this control scheme, UPDI flows at a constant rate, and either is used at the process, or is dumped for possible reclaim.

Alternatively, when fluid demand is low, a fluid heater can be operated in a reduced or low-flow mode (to maintain water purity), and when a high-flow is required, the output flow bypasses the process until the output temperature stabilizes. With the increase in chemical costs, largely due to purity levels and the cost of disposal, these methods are no longer acceptable in the industry. Flow rate changes, and temperature set-point changes for specific process "recipes" are becoming the standard rather than the exception.

Accordingly, it has been considered desirable to develop a new and improved control system for fluid heater which meets the above-stated needs and overcomes the foregoing difficulties and others while providing better and more advantageous results.

SUMMARY OF THE INVENTION

The Demand Anticipation Control (DAC) system of the present invention provides accurate temperature control over a broad range of loads. This is accomplished by determining the variables that affect the output temperature of the loads, determining the level of power required to achieve the set point temperature, and applying the necessary power to a heater element associated with the fluid heater. In a standard PID-based system, the only variables measured are temperature, and rate of temperature change of the load. The DAC system determines: 1) inlet fluid temperature, 2) outlet fluid temperature, 3) flow rate of fluid heated, 4) power applied to the heater system, and 5) rate of fluid temperature change per unit of time.

In operation, the user of the system inputs the desired operating temperature into a controller via a keyboard or other user interface. The power level required to bring the load to the set point temperature is determined based on input values measured by a plurality of sensors. The power applied to the heater element is continually adjusted in real time.

Inefficiencies of the fluid heater, and inherent errors in measurements taken, can all lead to temperature instability. To overcome these problems, the DAC system has been designed to minimize these effects. Power applied to the heater element is the single largest source of error in an electrically heated system. This is due to the variations in heater resistance with respect to the operating temperature of the heater element. The DAC system measures the power applied to the heater element in real time to remove these errors. Power can be measured/determined Ln a number of ways. One method is to measure the heater element temperature, compare it to a known curve for the type of resistance element used, and calculate the power applied at that temperature. Another method is to measure both voltage and current applied to the heater element and calculate power therefrom. The second method allows for universal heater application, without need for defining the temperature/resistance curve for each heater controlled. Thermal losses also can lead to errors. The DAC system corrects for these losses by evaluating the temperature response of the load to power applied and offsetting power accordingly.

Measuring or calculating all the required variables, and determining power needed provides instant correction to maintain accurate temperature control over any load within the capabilities of the heater system. Even though the system can respond to these changes, thermal lags in the system result in temperature droops when going from a small load to a large load, and conversely temperature over-shoots when going from a large load to a small load. To reduce this effect, the DAC system applies more or less power to the heater element when the rate of change in the fluid temperature up or down exceeds a predetermined range. Additionally, the DAC system boosts, or reduces power to the heater element as a function of fluid temperature difference from the set point.

Thus, in accordance with one aspect of the present invention a control system is provided for a fluid heater. The fluid heater includes a housing having an inlet, an outlet, at least one fluid pathway through the housing, and a heating element proximate the fluid pathway for heating an operating fluid flowing through the pathway. The control system includes an inlet temperature sensor for determining the temperature of the fluid at the inlet, a flow sensor for determining the rate of fluid flow through the fluid pathway, and a switching device connected between a source of electrical power and the heating element. A controller is in communicatton with the temperature sensor, the flow sensor, and the switching device. The controller includes a first mechanism for determining a first power value based on inputs from the inlet temperature sensor and the flow sensor, the first power value being indicative of a power level required to heat the operating fluid to a setpoint temperature. A second mechanism determines a second power value indicative of an actual power level being applied to the heating element, and a third mechanism controls the switching device based on a difference between the first power value and the second power value.

In accordance with a second aspect of the present invention, a method for controlling a fluid heater is disclosed. The fluid heater includes a housing having an inlet and an outlet, at least one fluid pathway through the housing, a heating element proximate the fluid pathway for heating an operating fluid flowing through the pathway, and a switching device connected between a source of electrical power and the heating element. The method includes the steps of a) determining the temperature of the operating fluid at the inlet; b) determining the rate of operating fluid flowing through the fluid pathway; c) determining a first power value based on the temperature of the fluid at the inlet and the rate of operating fluid flowing through the inlet, the first power value being indicative of a power level required to heat the operating fluid to a first temperature setpoint; d) determining a second power value indicative of an actual power level being applied to the heating element; and e) controlling the switching device based on a difference between the first power value and the second power value.

In accordance with a third aspect of the present invention, a fluid heating system is disclosed. The fluid heating system includes a fluid heater having a housing with an inlet and an outlet, at least one fluid pathway through the housing, and a heating element proximate the fluid pathway for heating an operating fluid flowing through the pathway. The fluid heating system also includes a controller having a first mechanism for determining an actual power value indicative of a power level being applied to the heating element, a second mechanism for determining a needed power value indicative of a power level required to achieve an outlet fluid temperature substantially equal to a user-selectable preset fluid temperature, and a regulating mechanism for adjusting the power applied to the heating element based on an offset between the actual power value and the needed power value.

One advantage of the present invention is the provision of a new and improved temperature control system for use with in-line heaters that instantaneously responds to changes in load (e.g. fluid flow) by determining, in at least substantially real time, the factors that affect the amount of power required to achieve a user-selectable set point fluid temperature.

Another advantage of the present invention is the provision of a temperature control system that determines the actual power being applied to a heater element, compares the actual power to a theoretical power level necessary to achieve a set point temperature, and then adjusts the actual power to achieve the set point fluid temperature.

Still another advantage of the present invention is the provision of a temperature control system that adjusts the power applied to a heating element based on operating parameters such as the voltage drop across the heating element, the current level through the heating element, the operating temperature of the heating element, and/or the operating resistance of the heating element Yet another advantage of the present invention is the provision of a temperature control that corrects for thermal lags by increasing or decreasing the power applied to a heating element as a function of the rate of fluid temperature change.

A further advantage of the present invention is the provision of a temperature control that corrects for thermal lags by increasing or decreasing the power applied to a heating element as a function of a temperature offset or difference from a programmable set point temperature.

Yet further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangement of steps. The drawings are only for purposes of illustrating a preferred embodiment of the present invention and are not to be construed as limiting the same.

DETAILED DESCRIPTION OF THE PREFERRED EMBODIMENTS

Figure 1:
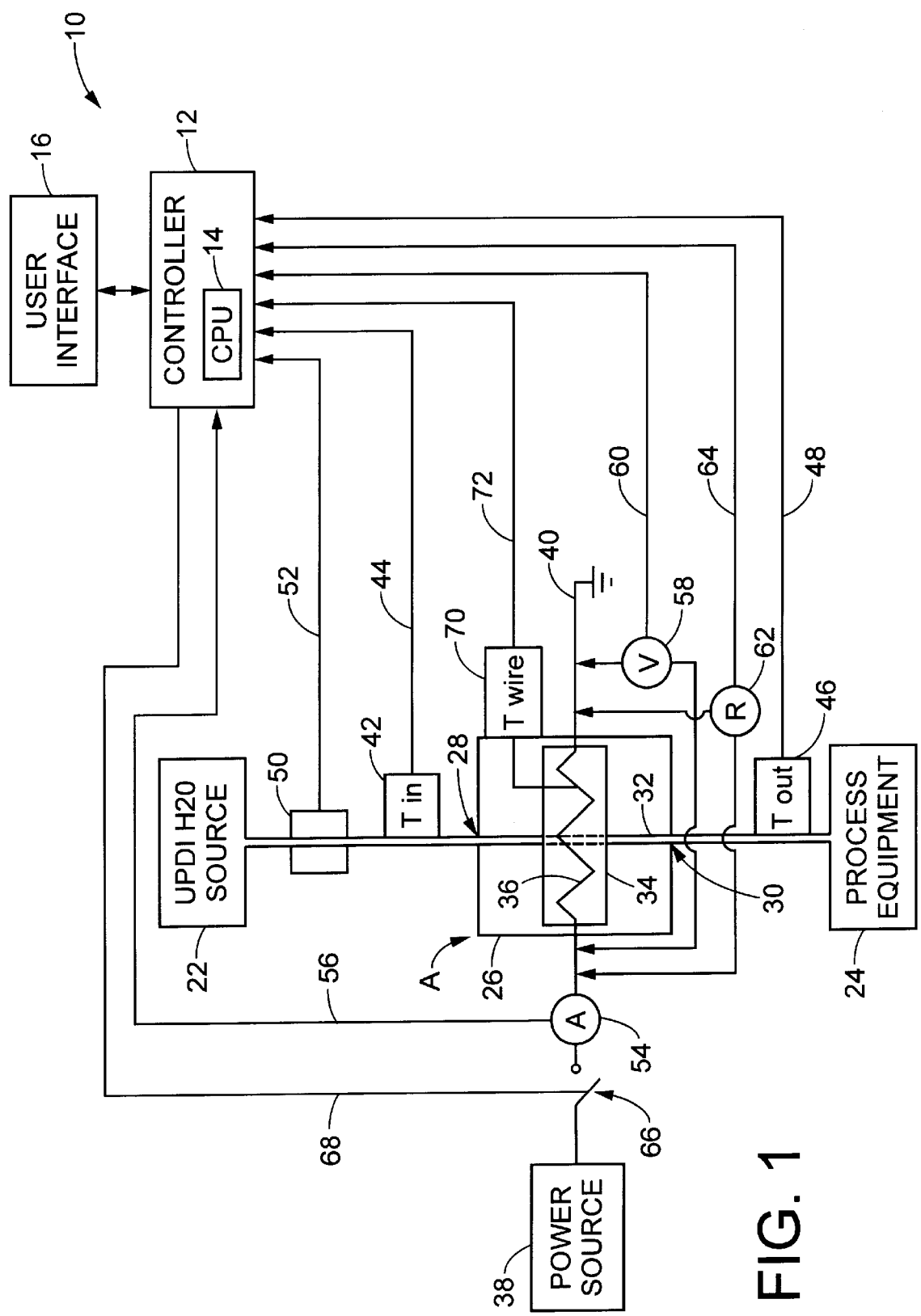
FIG. 1 is a simplified block diagram of a temperature control system for a fluid heater, which temperature control system incorporates the features of the present invention therein.

Referring now to the drawings which illustrate several preferred embodiments of the present invention, and are not to be construed as limiting the same, FIG. 1 illustrates a demand anticipation control (DAC) system 10 for an exemplary UPDI fluid heater A. It should, however, be appreciated by those of ordinary skill in the art that the temperature control system of the present invention could also be used with other types of fluid heaters and other types of fluids to be heated.

The DAC system 10 includes a controller 12 incorporating conventional hardware such as a microprocessor-based central processing unit (CPU) 14 and supporting circuits and/or devices (not shown) such as RAM, ROM, I/O, etc. A user may communicate with the controller via an interface 16 such as keyboard or keypad. The DAC system 10 provides temperature control for the fluid heater A. The fluid heater A is positioned in series between a supply 22 of UPDI water and process equipment 24 which utilizes heated UPDI during the manufacture of semiconductor devices.

The fluid heater A includes a housing 26 having a fluid inlet 28 coupled to the UPDI water supply 22, and a fluid outlet 30 coupled to the process equipment 24. At least one fluid pathway 32 extends through the housing 26 between the fluid inlet 28 and fluid outlet 30. A heating element 34 also extends through the housing 26 in close proximity to, yet sealed or isolated from, the fluid pathway 32. In the embodiment being described, the heating element 34 includes a resistive wire 36 such as a Nichrome (NiCr) resistive wire switchably connected between a source of electrical power 38 and a ground potential 40. The resistive wire 36 heats fluid flowing through the fluid pathway 32 by means of conduction, convection, and/or radiation. The nominal operating temperature of the Nichrome wire 36 is approximately 1400°–1450° F. (760°–788° C.) with a maximum operating temperature rating of approximately 1700° F. (927° C.). It should be appreciated that the heater wire 36 can vary from ambient to the maximum operating temperature (e.g. 1700° F./927° C.) based upon the heater design and required output power.

A first temperature sensor 42 is positioned proximate the fluid inlet 28 and is coupled to the controller 12 via an input line 44. The temperature sensor 42 measures or otherwise determines the temperature of the fluid entering the fluid heater A. The resulting inlet temperature value is available for use by the controller. A second temperature sensor 46 is positioned proximate the fluid outlet 30 and is coupled to the controller 12 via an input line 48. The temperature sensor 46 measures or otherwise determines the temperature of the fluid leaving the fluid heater A.

A flow sensor 50 is coupled to the controller via an input line 52 and measures or otherwise determines the rate of fluid flowing through the fluid pathway 32. An ampere sensor 54 or other device for determining the level of electrical current flowing through the resistive wire 36, is coupled to the controller 12 via an input line 56. A voltage sensor 58 or other device for determining the voltage drop across the resistive wire 36 is coupled to the controller via an input line 60. A resistance sensor 62 or other device for determining the resistance of the resistive wire 36 is coupled to the controller via an input line 64.

A switching device 66 controls the application of electrical power to the resistive wire 36. A control terminal of the switching device 66 is connected to the controller 12 via an output control line 68. The switching device 66 can be a solid-state relay such as a silicon-controlled rectifier (SCR) that provides time-based, duty-cycle control of the power being applied to the resistive wire 36. However, it is also contemplated that other time-based, voltage-based, or current-based devices can be used to regulate the power applied to the resistive wire 36 via a control signal from the controller 12. A third temperature sensor 70, such as a thermocouple, measures or otherwise determines the operating temperature of the resistive wire 36, and is connected to the controller via an input line 72.

The demand anticipation control system 10 provides accurate temperature control over a broad range of loads. What is meant herein by use of the term "load" is the rate of fluid flowing through the fluid heater, and in particular the fluid pathway 32, such as in gallons/minute (GPM). In operation, a user of the system inputs a desired operating temperature or set point into the controller 12 via the input device 16. As described in greater detail below, with the set point entered, the controller 1) determines the power required to bring the load to the set point temperature by using the input values measured or otherwise determined by one or more of the sensors, 2) determines the actual power being applied to the resistive wire 36, 3) compares the actual power to the theoretical power level necessary to achieve the set point temperature, and 4) thereafter continuously adjusts the actual power applied to the resistive wire in real time to achieve the set point fluid temperature at the output 30 of the fluid heater.

Figure 2:
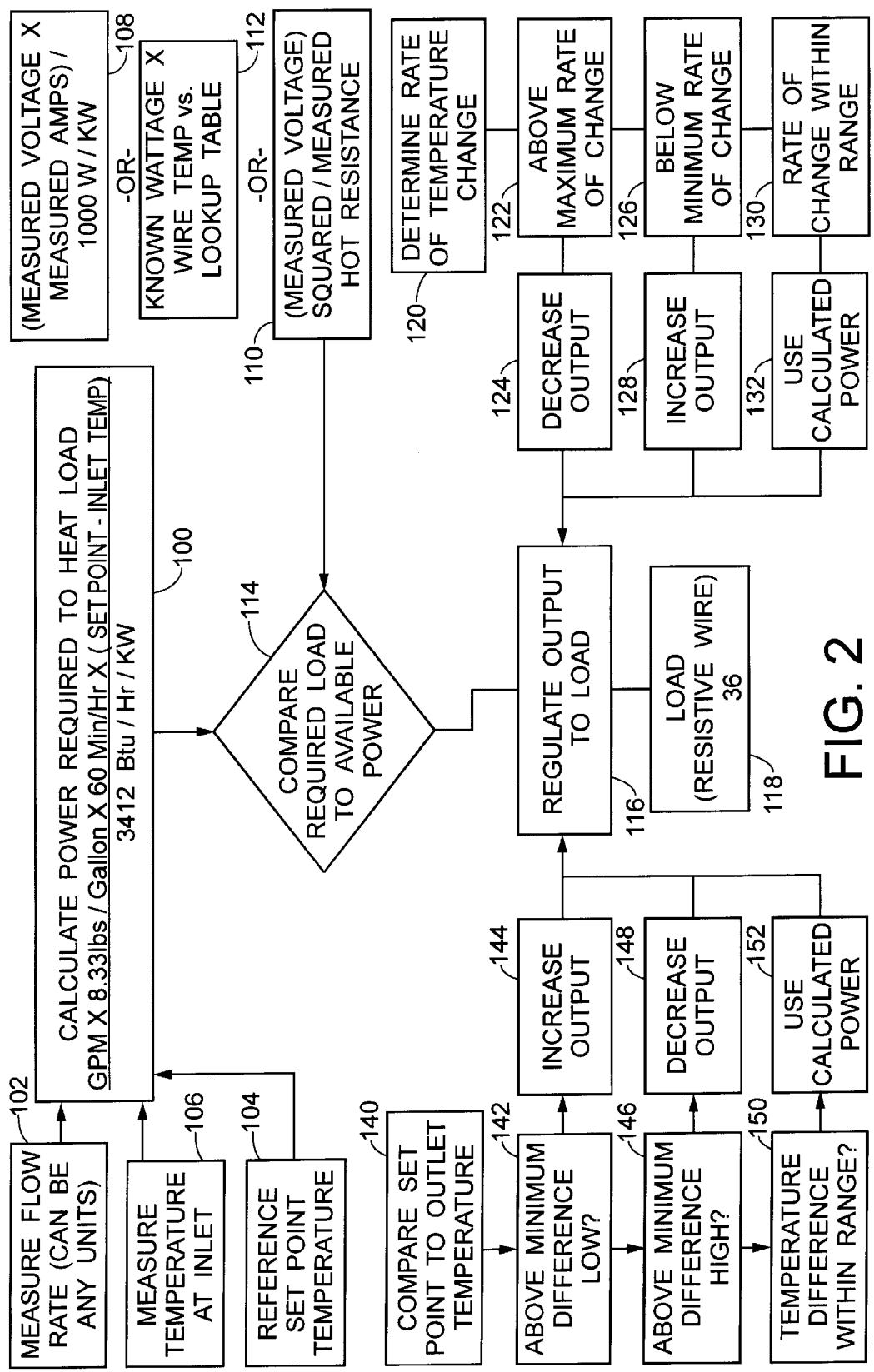
FIG. 2 is a operational flow diagram for the temperature control system of FIG. 1.

With continuing reference to FIG. 1, and particular reference to FIG. 2, the power, measured in kilowatts (kW), that is needed to bring the load to the set point temperature is determined from the following equation (block 100):

$$kW_{needed} = \frac{(xGPM) \cdot (8.33 \text{ lbs/gallon}) \cdot (60 \text{ min/hr}) \cdot (SP - T_{inlet})}{3412 \text{ Btu/Hr/kW,}} \quad (1)$$

where $kW_{needed}$ is the power required to heat the load to the set point temperature; x is the flow rate determined by the sensor 50 in gallons per minute (GPM) (block 102); SP is the set point temperature programmed into the controller (block 104); and $T_{inlet}$ is the inlet fluid temperature determined by the sensor 42 (block 106).

The actual power, in kilowatts, being supplied to the resistive wire 36 is determined from the following equation (block 108):

$$kW_{used} = \frac{(I) \cdot (V)}{1000 \text{ W/KW,}} \quad (2)$$

where $kW_{used}$ is the power being applied to the resistive wire 36; I is the current in amperes flowing through the resistive wire 36 determined by the current sensor 54; and V is the voltage drop across the resistive wire 36 determined by the voltage sensor 58. This method of calculating the actual power being applied to the resistive wire allows for universal heater application, without the need to define a temperature/resistance curve or look-up table for each type of resistance wire used, as described further below.

In particular, a less accurate and lower cost method of determining the actual power being applied to the resistive wire 36 (block 112), is to first determine the temperature of the resistive wire, such as by temperature sensor 70. The measured temperature value can be compared with a known temperature vs. resistance curve, look-up table, or fourth order polynomial describing the curve, for the particular type of resistance wire used. That is, the resistance of the wire 36 is a function of its operating temperature. Once the resistance value is determined, it can be compared with the designed value following the equation:

$$kW_{used} = \frac{V^2}{R} \quad (3)$$

where $kW_{used}$ is the power being applied to the resistive wire 36; V is determined by a percentage of power out from a programmed value entered by the user. The power out is then adjusted accordingly.

That is, a user can enter a value into the controller 12 that represents the rated power of the resistive wire 36 when it is operating at the rated temperature. The resistance of the wire 36 at ambient room temperature is typically 5–10% lower than what is calculated from the following equation:

$$R = \frac{V^2}{kW_{rated}} \quad (4)$$

By way of example, for a 50 kW, 480 volt resistive wire, the actual resistance for single phase power is about 4.608 ohms. However, when using the "cold" factor for NiCr wire, the design resistance is only 4.367 ohms. If the resistance did not change with temperature, the power at 480 volts would be 52.76 kW. When the applied voltage is reduced via the controller 12, the wire temperature cools, and the resistance goes down. Assuming for ease of explanation, that the power needed was one-fourth of the heater capacity. Following Ohm's law equation (4), since it is a square function, one-half of the voltage should produce one-fourth of the power. However, 240²/4.487=12.836 kW, 0.300 kW more than needed to achieve the set point temperature. Note that the resistance value (4.487) falls between the cold resistance value and the design resistance value (the actual value would be determined from a look-up table for NiCr wire. This function corrects for the error by simply changing voltage as a function of percentage of power.

Yet another method can be used to determine the actual power being applied to the resistive wire 36. In particular, as shown in block 110, both the voltage drop across the resistance wire 36, measured by the sensor 58, and the resistance of the resistive wire 36, measured by the sensor 62, are determined in at least substantially real time. Applied power can therefore be determined from equation (2) above.

By comparing the power being applied to the resistance wire 36, as determined in any of blocks 108, 110, or 112, to the power needed to bring the load to the set point, as determined in block 100, a difference value can be obtained (block 114). The difference value may be expressed in terms of a percentage increase or percentage decrease of the power being applied to the resistive wire 36. Accordingly, the power being applied to the resistive wire 36 (block 116), is adjusted, in part, based on the difference value obtained in block 114 (block 118).

Determining all the required parameters, and determining power needed, provides instant correction to maintain accurate temperature control over any load within the capabilities of the heater system. Even though the system can respond to these changes, thermal lags in the system can result in temperature droops when going from a small load to a large load, and conversely temperature over-shoots when going from a large load to a small load. To reduce this effect, the DAC system 10 adjusts the power applied to the resistive wire when the rate of change of the fluid temperature up or down exceeds an acceptable range.

In particular, the DAC system 10 boosts, or reduces the power applied to the resistive wire 36 as a function of the rate of temperature change between the inlet fluid temperature and the outlet fluid temperature (block 120). If the rate of fluid temperature change is greater than a user-programmable or factory set point, (block 122), then the power applied to the resistive wire 36 is decreased until the rate of change is reduced to within a predetermined range (block 124). If the rate of fluid temperature change is less than a user programmable or factory set point, (block 126), then the power applied to the resistive wire 36 is increased until the rate of change is increased to within a predetermined range (block 128). Once it is determined that the rate of fluid temperature change is within an acceptable range (block 130), then the power applied to the resistive wire 36 is again continuously adjusted based on the percentage difference between the needed power (block 114) and the actual power (blocks 108, 110, or 112) (block 132).

The DAC system 10 can also boost, or reduce the power applied to the heating element as a function of the fluid temperature difference (e.g. temperature offset) from the set point. That is, the set point value is compared with the temperature of the fluid at the outlet 30 (block 140), as measured by the temperature sensor 46.

If the outlet temperature is less than the set point by more than a preset difference level (block 142) (user-selectable or factory preset), then the power applied to the resistive wire 36 is increased until the offset is reduced to within a predetermined range (block 144). If the outlet temperature is greater than the set point by more than a preset difference level (block 146), then the power applied to the resistive wire 36 is decreased until the offset is reduced to within the predetermined range (block 148). Once the outlet temperature is determined to be within an acceptable range of the set point (block 150), then the power level is again adjusted based on the percentage difference between the needed power (block 114) and the actual power (blocks 108, 110, or 112) (block 152).

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A control system for a fluid heater including a housing having an inlet and an outlet, at least one fluid pathway through the housing, and a heating element proximate the fluid pathway for heating an operating fluid flowing through the pathway, the control system comprising:

an inlet temperture sensor for determining the temperature of the operating fluid at the inlet;

a flow sensor for determining the rate of operating fluid flow through the fluid pathway;

a switching device connected between a source of electrical power and the heating element; and a controller in communication with the temperature sensor, the flow sensor, and the switching device, the controller including
   first means for determining a first power value based on inputs from the inlet temperature sensor and the flow sensor, the first power value being indicative of a power level required to heat the operating fluid to a setpoint temperature,
   second means for determining a second power value indicative of an actual power level being applied to the heating element, and
   third means for controlling the switching device based on a difference between the first power value and the second power value.

2. The control system of claim 1, wherein the heating element is a resistive heating element.

3. The control system of claim 2, further including:

a current sensor for determining a current level flowing through the resistive heating element;

a voltage sensor for determining a voltage drop across the resistive heating element; and the second means determining the second power value based on inputs from the current sensor and the voltage sensor.

4. The control system of claim 2, further including:

a second temperature sensor for determining an operating temperature of the resistive heating element;

means for determining a resistance value of the resistive heating element based on an input from the second temperature sensor;

the second means determining the second power value based on the resistance value.

5. The control system of claim 2, further including:

a resistance sensor for determining a resistance value of the resistive heating element;

a voltage sensor for determining a voltage drop across the resistive heating element; and the second means determining the second power value based on inputs from the resistance sensor and the voltage sensor.

6. The control system of claim 1, further including:

an outlet temperature sensor for determining a temperature of the fluid at the outlet; and fourth means associated with the controller for overriding the third means when a rate of change between the temperature of the fluid at the inlet and the temperature of the fluid at the outlet is greater than a first rate of change set point or less that a second rate of change set point.

7. The control system of claim 1, further including:

an outlet temperature sensor for determining a temperature of the fluid at the outlet; and fourth means associated with the controller for overriding the third means when a difference between the temperature of the fluid at the inlet and the temperature of the fluid at the outlet is greater than a first temperature difference set point or less that a second temperature difference set point.

8. The control system of claim 1, wherein the switching device is a solid-state relay.

9. The control system of claim 1, further including a user interface communicating with the controller for entering the setpoint temperature.

10. A fluid heating system, comprising:

a fluid heater having a housing with an inlet and an outlet, at least one fluid pathway through the housing, and a heating element proximate the fluid pathway for heating an operating fluid flowing through the pathway; and a controller including first means for determining an actual power value indicative of a power level being applied to the heating element, second means for determining a needed power value indicative of a power level required to achieve an outlet fluid temperature substantially equal to a user-selectable preset fluid temperature, and regulating means for adjusting the power applied to the heating element based on an offset between the actual power value and the needed power value.

11. The fluid heating system of claim 10, further including:

an inlet temperture sensor for determining a temperature of the operating fluid at the inlet;

a flow sensor for determining a rate of fluid flowing through the fluid pathway; and the second means determining the needed power value based on inputs from the inlet temperature sensor and the flow sensor.

12. The fluid heating system of claim 11, further including:

a current sensor for determining a current level flowing through the heating element;

a voltage sensor for determining a voltage drop across the heating element; and the first means determining the actual power value based on inputs from the current sensor and the voltage sensor.

13. The fluid heating system of claim 10, wherein the controller further includes:

means for overriding the regulating means when a difference between the temperature of the fluid at the inlet and the temperature of the fluid at the outlet is greater than a first temperature difference set point or less that a second temperature difference set point.

14. The fluid heating system of claim 10, wherein the controller further includes means for overriding the regulating means when a rate of change between the temperature of the operating fluid at the inlet and the temperature of the fluid at the outlet is greater than a first rate of change set point or less that a second rate of change set point.

* * * * *